(12) United States Patent
Shen et al.

(10) Patent No.: US 12,091,117 B2
(45) Date of Patent: Sep. 17, 2024

(54) APPARATUS AND METHOD FOR BICYCLE ANTI-THEFT

(71) Applicant: Giant Manufacturing Co., Ltd., Taichung (TW)

(72) Inventors: Chih-Hsiang Shen, Taichung (TW); Chia-Jung Chang, Taichung (TW)

(73) Assignee: Giant Manufacturing Co., Ltd., Taichung (TW)

( * ) Notice: Subject to any disclaimer, the term of this patent is extended or adjusted under 35 U.S.C. 154(b) by 348 days.

(21) Appl. No.: 17/361,350

(22) Filed: Jun. 29, 2021

(65) Prior Publication Data

US 2021/0323622 A1 Oct. 21, 2021

Related U.S. Application Data

(63) Continuation-in-part of application No. 16/029,656, filed on Jul. 9, 2018, now Pat. No. 11,084,400.

(30) Foreign Application Priority Data

Dec. 28, 2017 (TW) .................................. 106146145

(51) Int. Cl.
| | |
|---|---|
| *B62H 5/18* | (2006.01) |
| *B62H 5/14* | (2006.01) |
| *B62J 45/414* | (2020.01) |
| *B62J 45/416* | (2020.01) |
| *B62L 3/02* | (2006.01) |
| *B62L 3/06* | (2006.01) |
| *G07C 9/00* | (2020.01) |

(52) U.S. Cl.
CPC ................. *B62H 5/18* (2013.01); *B62H 5/14* (2013.01); *B62H 5/141* (2013.01); *B62H 5/142* (2013.01); *B62H 5/148* (2013.01); *B62J 45/416* (2020.02); *B62L 3/02* (2013.01); *B62L 3/06* (2013.01); *G07C 9/00563* (2013.01); *B62J 45/414* (2020.02)

(58) Field of Classification Search
CPC . B62H 5/18; B62H 5/14; B62H 5/141; B62H 5/142; B62H 5/148; B62J 45/416; B62J 45/414; B62L 3/02; B62L 3/06; G07C 9/00563

See application file for complete search history.

(56) References Cited

U.S. PATENT DOCUMENTS

| | | | | |
|---|---|---|---|---|
| 6,980,672 | B2 * | 12/2005 | Saito | G07C 9/37 340/5.53 |
| 8,752,853 | B2 * | 6/2014 | Fulghum | B60T 7/102 280/264 |
| 2010/0252380 | A1 * | 10/2010 | Nguyen | B62L 3/06 70/224 |

FOREIGN PATENT DOCUMENTS

| | | | | |
|---|---|---|---|---|
| CN | 105818890 A | * | 8/2016 | ............ B62H 5/18 |
| CN | 106741336 A | * | 5/2017 | ............ B62H 5/18 |
| CN | 207157352 U | * | 3/2018 | ............ B62H 5/18 |

(Continued)

OTHER PUBLICATIONS

Translation of CN 105818890 A, 7 pages (Year: 2016).*

(Continued)

*Primary Examiner* — Dale W Hilgendorf
(74) *Attorney, Agent, or Firm* — JCIPRNET

(57) ABSTRACT

An apparatus and a method for bicycle anti-theft are provided. When a biometric feature of a user matches a preset biological feature, a brake lever is fixed at a preset position to lock the bicycle.

17 Claims, 8 Drawing Sheets

(56) References Cited

FOREIGN PATENT DOCUMENTS

FR 2937450 A1 * 4/2010 ......... G07C 9/00174
SK 500502015 A3 * 4/2017 ............... B62H 5/00

OTHER PUBLICATIONS

Translation of CN 106741336 A, 7 pages (Year: 2017).*
Translation of CN 207157352 U, 5 pages (Year: 2018).*
Translation of SK 500502015 A3 A, 23 pages (Year: 2017).*
Translation of FR-2937450-A1, 11 pages (Year: 2010).*

* cited by examiner

APPARATUS AND METHOD FOR BICYCLE ANTI-THEFT

CROSS-REFERENCE TO RELATED APPLICATION

This application is a continuation-in-part application of and claims the priority benefit of U.S. Pat. No. 11,084,400, filed on Jul. 9, 2018, now allowed, which claims the priority benefit of Taiwan application serial no. 106146145, filed on Dec. 28, 2017. The entirety of each of the above-mentioned patent applications is hereby incorporated by reference herein and made a part of this specification.

BACKGROUND

Technical Field

The disclosure is related to an identification application device, and more particularly, to an apparatus and a method for bicycle anti-theft.

Description of Related Art

In the past, approaches for bicycle anti-theft are nothing more than the use of chains, steel locks, mechanical locks and so forth, such anti-theft approaches not only have drawbacks in which the locks are bulky, dirty and inconvenient to carry, but also might fall into the dilemma of unable to unlock the locks if the keys are missing or the passwords are forgotten. Moreover, for riders of different body sizes, bicycle parts are required to be adjusted, such as adjusting a height of a saddle, a height of a stem/handlebar and so forth, to enable the riders to ride the bicycles with a correct riding posture so as to avoid sports injuries. However, conventional adjustment approaches require the adjustments to be carried out manually with experiences and must be repeated back and forth for several times in order to achieve the desired adjustment results.

SUMMARY

The disclosure is directed to an apparatus and a method for bicycle anti-theft, which can greatly improve the convenience of use of a bicycle.

An anti-theft apparatus for a bicycle of the disclosure includes a fixing device, a biometric feature identification device, a brake, a brake lever, and a control device. The biometric feature identification device identifies a biometric feature of a user. The brake lever is coupled to the brake, and the brake is operated along with movement of the brake lever. The control device is coupled to the biometric feature identification device and the fixing device. When the brake lever is pressed to a preset position to drive the brake to carry out braking and the biometric feature of the user matches a preset biological feature, the control device controls the fixing device to fix the brake lever at the preset position to lock the bicycle.

In one embodiment of the disclosure, the biometric feature identification device includes a fingerprint sensor disposed on a lever seat of the brake lever.

In one embodiment of the disclosure, the brake lever includes a fixing hole, the fixing device includes a fixing bolt which is movable, and when the brake lever is pressed to the preset position and the biometric feature of the user matches the preset biological feature, the control device controls the fixing device to insert the fixing bolt into the fixing hole so as to fix the brake lever at the preset position.

In one embodiment of the disclosure, the brake lever includes an engaging slot, the fixing device includes a positioning member which is movable, and when the brake lever is pressed to the preset position and the biometric feature of the user matches the preset biological feature, the control device controls the fixing device to drive the positioning member to be engaged within the engaging slot so as to fix the brake lever at the preset position.

In one embodiment of the disclosure, the control device further receives a biometric feature information by wireless communication and determines whether the biometric feature information matches the preset biological feature. When the brake lever is pressed to the preset position and the biometric feature information matches the preset biological feature, the control device controls the fixing device to fix the brake lever at the preset position.

In one embodiment of the disclosure, the preset biological feature includes at least one of a fingerprint, a palm print, a vocal print and vascular markings of the user.

In one embodiment of the disclosure, when the brake lever is pressed to the preset position to drive the brake to carry out braking, a moving speed of the bicycle is equal to 0 and the biometric feature of the user matches the preset biological feature, the control device controls the fixing device to fix the brake lever at the preset position to lock the bicycle.

In one embodiment of the disclosure, the anti-theft apparatus comprises a moving state sensor coupled to the control device, the moving state sensor senses the moving state of the bicycle to generate a moving state sensing signal, the control device determines whether the moving speed of the bicycle is equal to zero according to the moving state sensing signal.

In one embodiment of the disclosure, the moving state sensor includes at least one of a wheel speed sensor, a gravity sensor, a gyroscope sensor, an inertial measurement unit sensor and an acceleration sensor.

An anti-theft method of the disclosure is adapted for an anti-theft apparatus of a bicycle, and the anti-theft method includes the following steps. A biometric feature of a user is identified. A brake lever of the bicycle is being determined on whether it is pressed to a preset position to drive a brake to carry out braking, and the biometric feature of the user is being determined on whether it matches a preset biological feature. When the brake lever is pressed to the preset position to drive the brake to carry out braking and the biometric feature of the user matches the preset biological feature, the brake lever is fixed at the preset position to lock the bicycle.

In one embodiment of the disclosure, the anti-theft method for the anti-theft apparatus of the bicycle further includes the following steps. A biometric feature information is received by wireless communication. The brake lever of the brake is being determined whether it is pressed to the preset position, and the biometric feature information is being determined on whether it matches the preset biological feature. When the brake lever is pressed to the preset position and the biometric feature information matches the preset biological feature, the brake lever is fixed at the preset position.

In one embodiment of the disclosure, the preset biological feature includes at least one of a fingerprint, a palm print, a vocal print and vascular markings of the user.

In one embodiment of the disclosure, the anti-theft method for the anti-theft apparatus of the bicycle further includes the following steps. Determining whether a moving speed of the bicycle is equal to 0. When the brake lever is pressed to the preset position to drive the brake to carry out braking, the moving speed of the bicycle is equal to 0 and the biometric feature of the user matches the preset biological feature, the brake lever is fixed at the preset position to lock the bicycle.

According to the above, in the embodiments of the disclosure, when the biometric feature of the user matches the preset biological feature, action of locking the bicycle can be executed, thereby achieving the purpose of improving the convenience of use of the bicycle.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
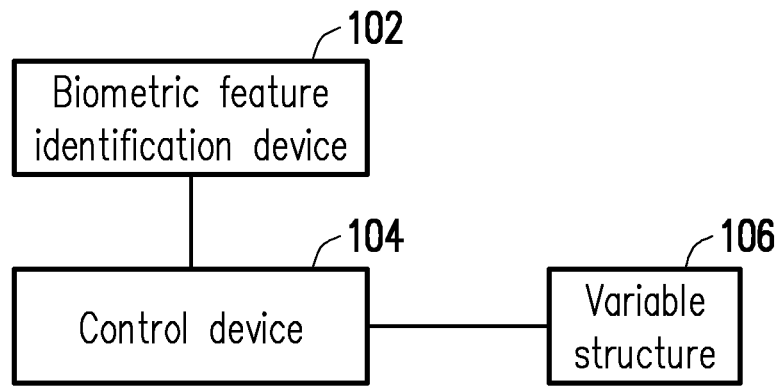
FIG. 1 is a schematic diagram illustrating a personalized adjustment apparatus for a bicycle according to an embodiment of the disclosure.

FIG. 1 is a schematic diagram illustrating a personalized adjustment apparatus for a bicycle according to an embodiment of the disclosure. Referring to FIG. 1, the personalized adjustment apparatus for a bicycle may include a biometric feature identification device 102, a control device 104 and a variable structure 106. The control device 104 is coupled to the biometric feature identification device 102 and the variable structure 106. The biometric feature identification device 102 can identify a biometric feature of a user, such as at least one of a fingerprint, a palm print, a vocal print and vascular markings of the user, but not limited thereto. The variable structure 106 may, for example, include adjustable structures such as a saddle and a bicycle handlebar. The control device 104 may, for example, include elements such as a control chip, a processor, a data storage device (e.g., a non-volatile memory) and a driver (e.g., an electric motor) for controlling the variable structure 106 to make adjustments, but not limited thereto.

Figure 2:
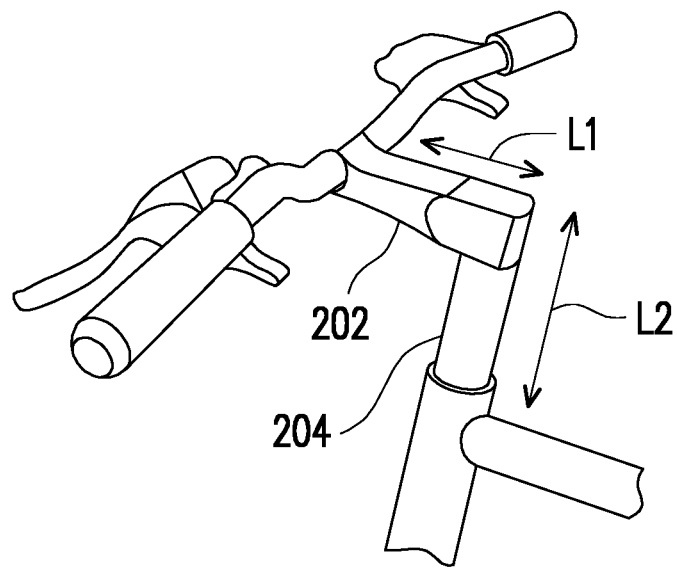
FIG. 2 is a schematic diagram illustrating a personalized adjustment apparatus for a bicycle according to an embodiment of the disclosure.

The control device 104 can determine whether the biometric feature of the user that is identified by the biometric feature identification device 102 matches a preset biological feature. When the biometric feature of the user matches the preset biological feature, the control device 104 can drive the variable structure 106 to make a personalized adjustment according to bicycle adjustment parameters corresponding to the biometric feature of the user. The bicycle adjustment parameters may, for example, be at least one of an adjustment parameters of a height of the saddle, an adjustment parameters of an angle of the saddle and an adjustment parameters of a displacement of the saddle and an adjustment parameters of a height of the bicycle handlebar, an adjustment parameters of an angle of the bicycle handlebar and an adjustment parameters of a displacement of the bicycle handlebar, and the personalized adjustment may, for example, be driving the variable structure 106 to adjust at least one of the height, the angle and the displacement of the saddle and the height, the angle and the displacement of the bicycle handlebar according to the bicycle adjustment parameters corresponding to the biometric feature of the user. For example, FIG. 2 is a schematic diagram illustrating a personalized adjustment apparatus for a bicycle according to an embodiment of the disclosure. As shown in FIG. 2, the control device 104 can, for example, drive the variable structure 106 to adjust a length L1 of a stem 202 and a length L2 of a steering tube 204 (i.e., the height of the steering tube 204) of the bicycle according to the bicycle adjustment parameters corresponding to the biometric feature of the user, so as to adjust the height and the displacement of the bicycle handlebar. The bicycle adjustment parameters can be stored in the data storage device of the control device for being compared with the biometric feature of the user by the control device 104.

As such, by using the control device 104 to automatically drive the variable structure 106 to make the personalized adjustment according to the bicycle adjustment parameters corresponding to the biometric feature of the user when the biometric feature of the user matches the preset biological feature, the bicycle can be accurately adjusted to a state suitable for the user to ride on, thereby increasing the convenience of use of the bicycle.

Figure 3:
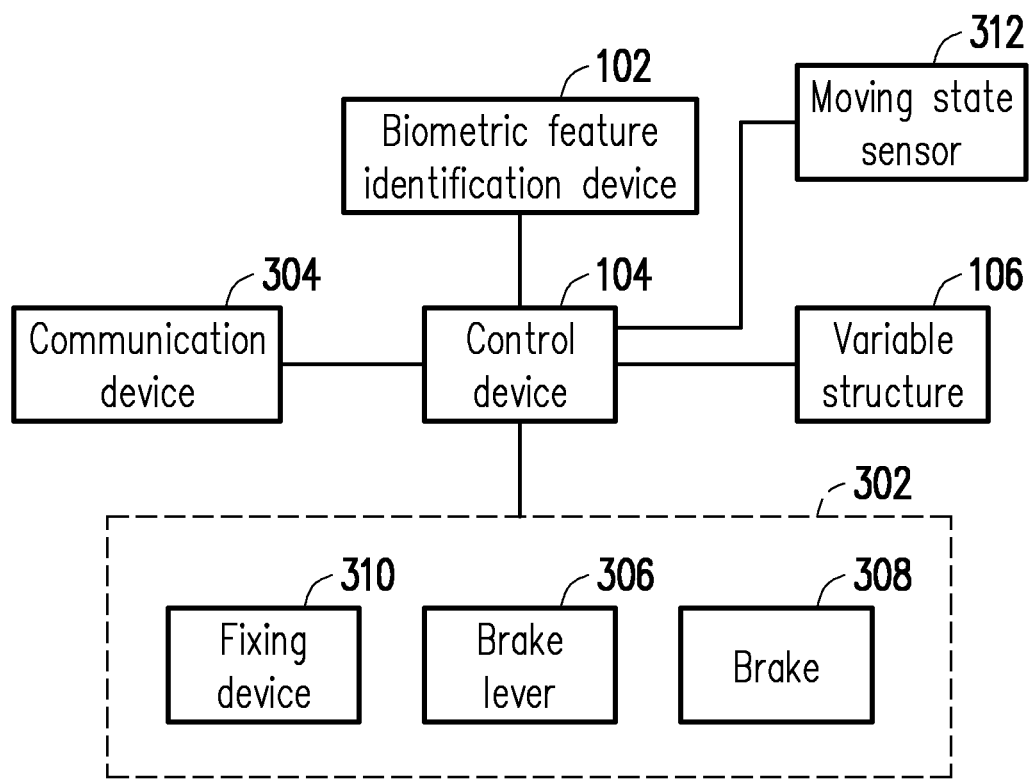
FIG. 3 is a schematic diagram illustrating a personalized adjustment apparatus (anti-theft apparatus) for a bicycle according to an embodiment of the disclosure.

FIG. 3 is a schematic diagram illustrating a personalized adjustment apparatus (anti-theft apparatus) for a bicycle according to an embodiment of the disclosure. Referring to FIG. 3, as compared to the embodiment of FIG. 1, the personalized adjustment apparatus of the present embodiment further includes a safety device 302, a communication device 304 and a moving state sensor 312, wherein the safety device 302, the communication device 304 and the moving state sensor 312 are coupled to the control device 104. The safety device 302 can prevent the user from inadvertently carrying out the adjustment action of the bicycle and adjusting the bicycle under an inappropriate condition (such as during riding at a certain speed, even though without any pedaling cadence). Only when the safety device 302 is in a disabled state and the biometric feature of the user matches the preset biological feature, the control device 104 can drive the variable structure 106 to make a personalized adjustment according to the bicycle adjustment parameters corresponding to the preset biological feature. In the present embodiment, the safety device 302 may, for example, include a brake lever 306, a brake 308 and a fixing device 310, wherein the brake lever 306 is coupled to the brake 308, and the brake 308 is operated along with movement of the brake lever 306. When the brake lever 306 is not pressed to a preset position, the safety device 302 is entered into an enabled state, and when the brake lever 306 is pressed to the preset position to drive the brake 308 to carry out braking, the safety device 302 can enter the disabled state. As such, only when the bicycle is in a braking state (the safety device 302 being in the disabled state) and the biometric feature of the user matches the preset biological feature, the control device 104 can drive the variable structure 106 to make a personalized adjustment to the bicycle, thus improving the safety of bicycle. In some of the embodiments, a sensor (e.g., a piezoelectric sensor) can be configured at the brake lever 306 or the brake 308 for detecting an actuation condition of the brake lever 306 or the brake 308, so that the control device 104 can know whether the brake lever 306 is pressed to the preset position according to a sensing signal of the sensor.

In addition, the fixing device 310 of the present embodiment can be controlled by the control device 104 to fix brake lever 306 at the preset position when the brake lever 306 is pressed to the preset position to drive the brake 308 to carry out braking and the biometric feature of the user matches the preset biological feature, so as to lock the bicycle. Accordingly, the personalized adjustment apparatus of the present embodiment may be used as an anti-theft apparatus for the bicycle. Moreover, when it is to release the bicycle from the lock state, the user can provide the biometric feature thereof to the biometric feature identification device 102 (such as by pressing the fingerprint sensor to provide the fingerprint); when the control device 104 determines that the bicycle is already in the lock state and the biometric feature of the user matches the preset biological feature, the control device 104 controls the fixing device 310 to release the bicycle from the lock state.

In some embodiments, in addition to determining whether the brake lever 306 of the bicycle is pressed to the preset position to drive the brake to carry out braking and whether the biometric feature of the user matches the preset biological feature, the control device 104 may further determine whether the moving speed of the bicycle is equal to 0. For example, the control device 104 may rely on a moving state sensing signal generated by the moving state sensor 312 to determine whether the moving speed of the bicycle is equal to 0 by sensing the moving state of the bicycle. The moving state sensor 312 may be, for example, at least one of a wheel speed sensor, a gravity sensor, a gyroscope sensor, an inertial measurement unit sensor and an acceleration sensor, and the moving state sensor 312 can be deposed at the bicycle or in a device attached on the body of riders. The control device 104 can control the fixing device 310 to fix the brake lever 306 at the preset position to lock the bicycle when the conditions all be matched, i.e., the brake lever 306 is pressed to the preset position to drive the brake 308 to carry out braking, the moving speed of the bicycle is equal to 0, and the biometric feature of the user matches the preset biological feature. In this way, it can be avoided that the bicycle is unintentionally locked before the bicycle is completely stopped, and the safety can be improved.

Furthermore, the biometric feature of the user, other than being obtained by the biometric feature identification device 102, may also be obtained from an external device with communication function, such as a mobile phone or a tablet PC. For example, the external device may have a biometric feature detection function, such as a fingerprint detection, the communication device 304 of the present embodiment can communicate with the external device via wired or wireless communication to receive a biometric feature information of the user provided by the external device, and the control device 104 can compare the biometric feature information with the preset biological feature to determine whether to perform a personalized adjustment to the bicycle or to activate the anti-theft function.

In some of the embodiments, the communication device 304 can further provide the user information to the external device, thereby enabling the external device to provide personalized services. For example, when user takes the bicycle entering into a commodity store, the communication device 304 can communicate with a multimedia player of the store to provide personal information of the user (e.g., name, birthday and so forth) to the multimedia player, and the multimedia player can search for a consumer record or keyword search history of the user according to the personal information of the user and provide relevant consumer information to the user (e.g., showing recommended products) according to search results, so as to facilitate the user in purchasing. In addition, when applied the above apparatus and method to bicycle rentals, the communication device 304 of the bicycle can receive member information (may include preset biological features and personalized adjustment parameters of the members) of a bicycle rental store sent from the external device, and thus the members only have to provide their own biometric features for comparing with the preset biological features when renting the bicycles so as to enable the bicycles to automatically carry out the personalized adjustment, thereby greatly improving the convenience of use.

It is to be noted that, in some of the embodiments, the variable structure 106 and the communication device 304 in the embodiment of FIG. 3 may both be configured selectively; when the embodiment of FIG. 3 does not include the adjustable variable structure 106, the apparatus in the embodiment of FIG. 3 is unable to provide a personalized adjustment function, but still can be used as an anti-theft apparatus for the bicycle.

Figure 4:
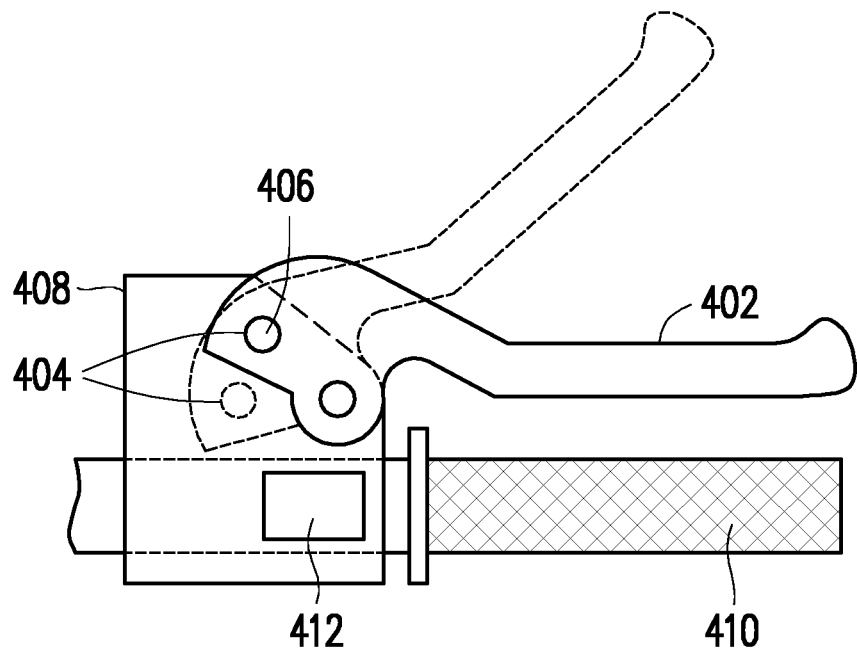
FIG. 4 is a schematic diagram illustrating a personalized adjustment apparatus (anti-theft apparatus) for a bicycle according to another embodiment of the disclosure.
Figure 5:
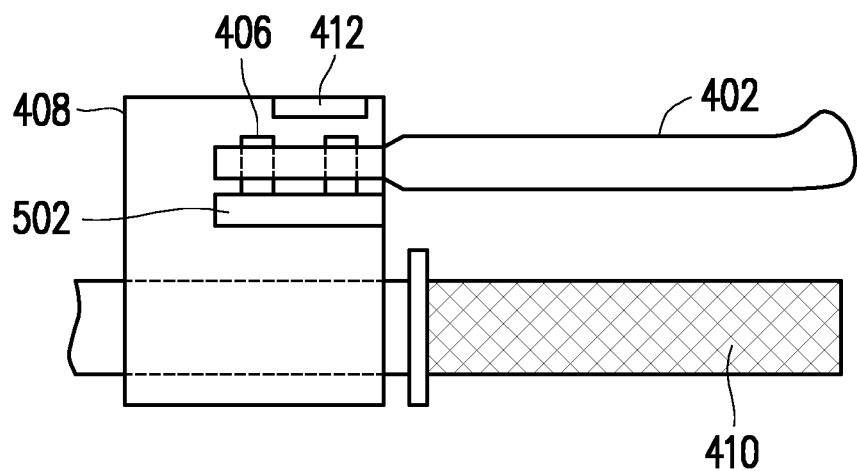
FIG. 5 is a schematic side view of the personalized adjustment apparatus (anti-theft apparatus) in the embodiment of FIG. 4.

FIG. 4 is a schematic diagram illustrating a personalized adjustment apparatus (anti-theft apparatus) for a bicycle according to another embodiment of the disclosure, and FIG. 5 is a schematic side view of the personalized adjustment apparatus (anti-theft apparatus) in the embodiment of FIG. 4. Referring to FIG. 4 and FIG. 5, in the present embodiment, the assembly part of the lever seat 408 is disposed on the handlebar 410, the biometric feature identification device 102 is disposed on the lever seat 408 beside the brake lever 402, and the biometric feature identification device 102 may, for example, be implemented by a fingerprint sensor 412. As shown in FIG. 4, the fingerprint sensor 412 may be disposed at position which allows a user finger to touch the fingerprint sensor 412 and carry out a fingerprint identification when the user presses the brake lever 402. The brake lever 402 is combined to the lever seat 408, and thus can rotate relative to the lever seat 408 so as to enable the brake 308 (FIG. 3) to carry out braking. The brake lever 402 includes a fixing hole 404, the fixing device 310 may, for example, include a driver 502 and a fixing bolt 406, and the driver 502 may, for example, include an electric motor.

When the brake lever 402 is pressed to the preset position and the biometric feature of the user matches the preset biological feature, that is, when the brake lever 402 is pressed to a position in which the fixing hole 404 and the fixing bolt 406 are aligned with each other and the biometric feature of the user matches the preset biological feature, the driver 502 can drive the fixing bolt 406 to move and be inserted into the fixing hole 404 so as to fix the brake lever 402 at the preset position, wherein when the brake lever 402 is fixed at the preset position, the bicycle is in the lock state. Moreover, when it is to release the bicycle from the lock state (braking state), the user can provide the biometric feature thereof to the biometric feature identification device 102 (such as by pressing the fingerprint sensor 412 to provide the fingerprint), and when the control device 104 determines that the bicycle is already in the lock state and the biometric feature of the user matches the preset biological feature, then the control device 104 controls the driver 502 to move the fixing bolt 406 out of the fixing hole 404 to enable the brake lever 402 to return to the position before being pressed, so as to cause the brake 308 to be released from braking, thereby releasing the bicycle from the lock state.

Figure 6:
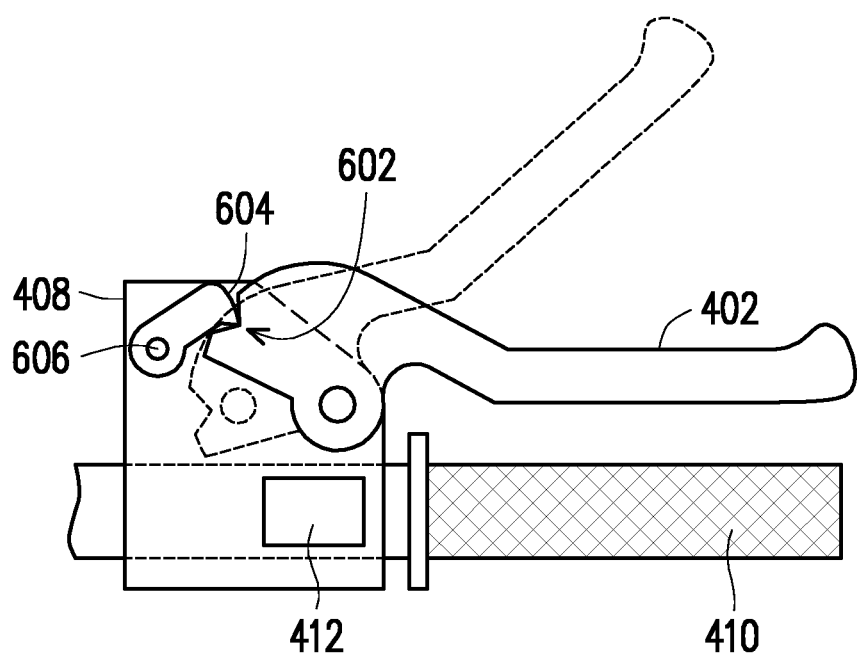
FIG. 6 is a schematic diagram illustrating a personalized adjustment apparatus (anti-theft apparatus) for a bicycle according to another embodiment of the disclosure.

FIG. 6 is a schematic diagram illustrating a personalized adjustment apparatus (anti-theft apparatus) for a bicycle according to another embodiment of the disclosure. Referring to FIG. 6, a difference between the present embodiment and the embodiment of FIG. 4 and FIG. 5 lies in that, the fixing device 310 of the present embodiment can be replaced by using a positioning member 604 to fix the brake lever 402. As shown in FIG. 6, the brake lever 402 of the present embodiment may include an engaging slot 602 which is capable of engaging with the positioning member 604. When the brake lever 402 is pressed to the preset position and the biometric feature of the user matches the preset biological feature, that is, when the brake lever 402 is pressed to a position in which the engaging slot 602 is suitable for being engaged with the positioning member 604 and the biometric feature of the user matches the preset biological feature, the control device 104 can control the driver (not shown; may, for example, include an electric motor) to drive the rotating shaft 606 to cause the positioning member 604 to rotate and engage into the engaging slot 602, so as to fix the brake lever 402 at the preset position, wherein when the brake lever 402 is fixed to the preset position, the bicycle is in the lock state. Moreover, when it is to release the bicycle from the lock state (braking state), the user can provide the biometric feature thereof to the biometric feature identification device 102 (such as by pressing the fingerprint sensor 412 to provide the fingerprint), and when the control device 104 determines that the bicycle is already in the lock state and the biometric feature of the user matches the preset biological feature, then the control device 104 controls the driver to drive the rotating shaft 606 into rotation to cause the positioning member 604 to rotate out of the engaging slot 602 to enable the brake lever 402 to return to the position before being pressed, so as to cause the brake 308 to be released from braking, thereby releasing the bicycle from the lock state.

It is to be noted that, in the embodiments of FIG. 4 to FIG. 6, the control device 104, in addition to determining whether the brake lever 402 is pressed to the preset position according to the sensing results of the piezoelectric sensor, may also use the electric motor to directly drive the fixing bolt 406 or the positioning member 604 and determine whether the brake lever 402 is pressed to the preset position according to a rotating condition of the electric motor (e.g., a rotation angle).

Figure 7:
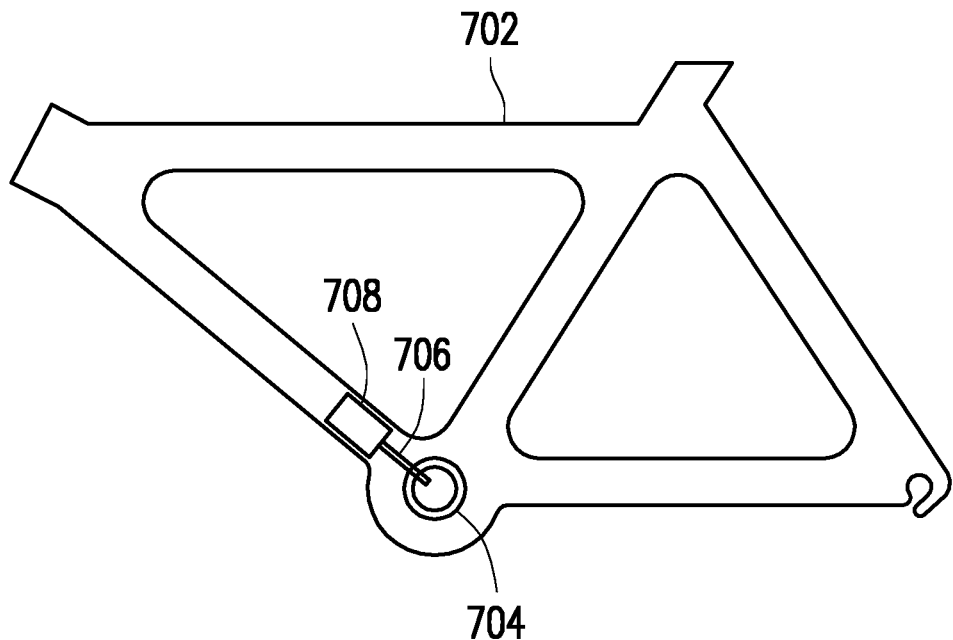
FIG. 7 is a schematic diagram illustrating an anti-theft apparatus for a bicycle according to an embodiment of the disclosure.

FIG. 7 is a schematic diagram illustrating an anti-theft apparatus for a bicycle according to an embodiment of the disclosure. Referring to FIG. 7, in the present embodiment, the fixing device may include a bottom bracket 704, a fixing bolt 706 and a driver 708, wherein the fixing bolt 706 and the driver 708 may, for example, be disposed at positions close to the bottom bracket 704 inside a hollow tube structure of the bicycle frame 702. The bottom bracket 704 has a through hole which is capable for inserting the fixing bolt 706, and when the fixing bolt 706 is driven by the driver 708 to be inserted into the through hole (as shown in FIG. 7), the bottom bracket 704 as being restricted by the fixing bolt 706 is unable to be rotating and thus causes the crank and chainset connected with the bottom bracket 704 also unable to be rotating anymore, thereby achieving the purpose of anti-theft.

Figure 8:
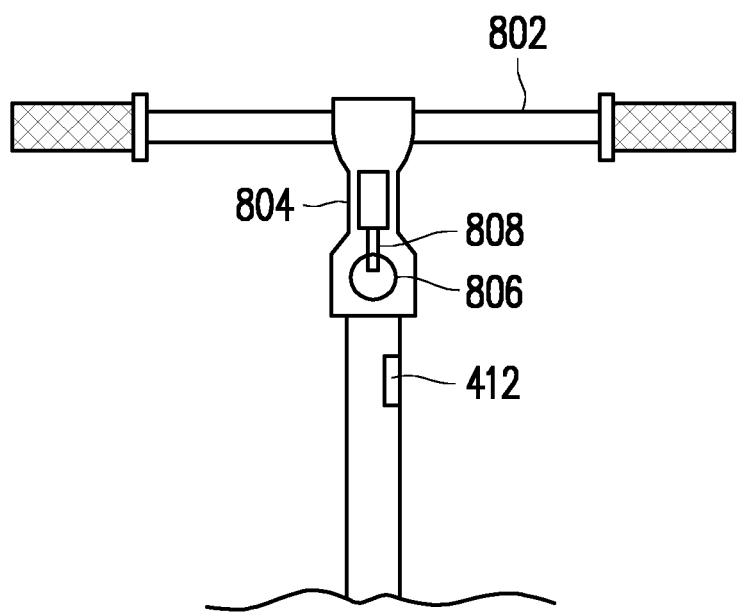
FIG. 8 is a schematic diagram illustrating an anti-theft apparatus for a bicycle according to another embodiment of the disclosure.

FIG. 8 is a schematic diagram illustrating an anti-theft apparatus for a bicycle according to another embodiment of the disclosure. Referring to FIG. 8, in the present embodiment, the fixing device may include the steering tube 806, the fixing bolt 808 and a driver, wherein the fixing bolt 808 and the driver for driving the fixing bolt 808 may, for example, be disposed inside the stem 804. The bicycle handlebar 802 and the stem 804 can be rotating relative to the steering tube 806, the steering tube 806 has a through hole which is for inserting the fixing bolt 808, and when the fixing bolt 808 is driven by the driver to be inserted into the through hole (as shown in FIG. 8), the bicycle handlebar 802 and the stem 804 as being restricted by the fixing bolt 808 are unable to be rotating relative to the steering tube 806, thus achieving the purpose of anti-theft. In addition, in the present embodiment, the fingerprint sensor 412 may be disposed on the bicycle frame to facilitate in adjusting positions of the bicycle handlebar 802 and the stem 804 when the user presses the fingerprint sensor 412, so as to enable the fixing bolt 808 to be inserted into the through hole smoothly.

Figure 9:
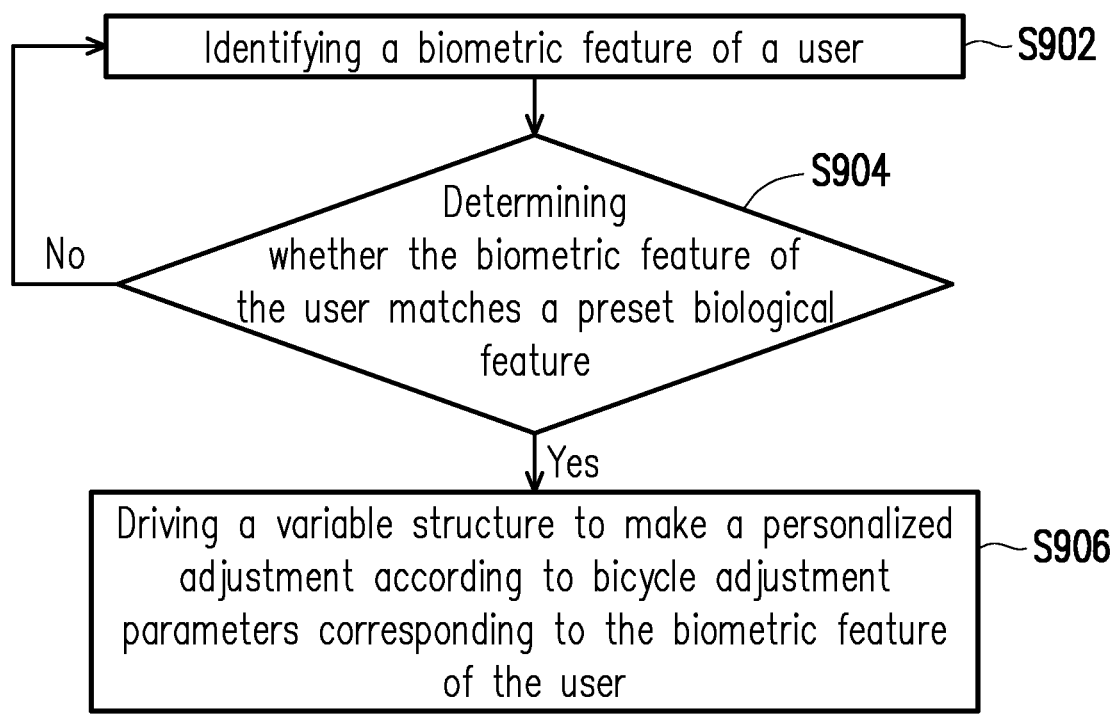
FIG. 9 is a schematic diagram illustrating a personalized adjustment method for a bicycle according to an embodiment of the disclosure.

FIG. 9 is a schematic diagram illustrating a personalized adjustment method for a bicycle according to an embodiment of the disclosure. Referring to FIG. 9, it can be known from the previous embodiments that the personalized adjustment method for a bicycle may include the following steps. Firstly, a biometric feature of a user is identified (step S902). Next, the biometric feature of the user is being determined on whether it matches a preset biological feature (step S904), wherein the preset biological feature may, for example, include at least one of a fingerprint, a palm print, a vocal print and vascular markings of the user, but not limited thereto; in some of the embodiments, biometric feature information of the user may also be received by wireless communication and be used for determining whether the biometric feature of the user matches the preset biological feature. When the biometric feature of the user matches the preset biological feature, a variable structure is driven to make a personalized adjustment according to bicycle adjustment parameters corresponding to the biometric feature of the user (step S906), wherein the variable structure may, for example, include a saddle and a bicycle handlebar, the bicycle adjustment parameters may include at least one of an adjustment parameters of a height of the saddle, an adjustment parameters of an angle of the saddle and an adjustment parameters of a displacement of the saddle and an adjustment parameters of a height of the bicycle handlebar, an adjustment parameters of an angle of the bicycle handlebar and an adjustment parameters of a displacement of the bicycle handlebar, and the personalized adjustment may, for example, drive the variable structure to adjust at least one of the height, the angle and the displacement of the saddle and the height, the angle and the displacement of the bicycle handlebar according to the bicycle adjustment parameters corresponding to the biometric feature of the user. On the contrary, if the biometric feature of the user does not match the preset biological feature, then returning back to the step S902 to continue identifying of the biometric feature of the user.

In some of the embodiments, determinations on whether a safety device is in a disabled state and whether the biometric feature of the user matches the preset biological feature may further be carried out, wherein only when the safety device is in the disabled state and the biometric feature of the user matches the preset biological feature, the variable structure can be driven to make a personalized adjustment according to the bicycle adjustment parameters corresponding to the biometric feature of the user. The safety device may, for example, include a brake and a brake lever, and the brake lever is coupled to the brake, and the brake is operated along with movement of the brake lever, wherein when the brake lever is pressed to the preset position to drive the brake to carry out braking, the safety device is entered into the disabled state, and when the brake lever is not pressed to the preset position, the safety device is entered into an enabled state.

Figure 10:
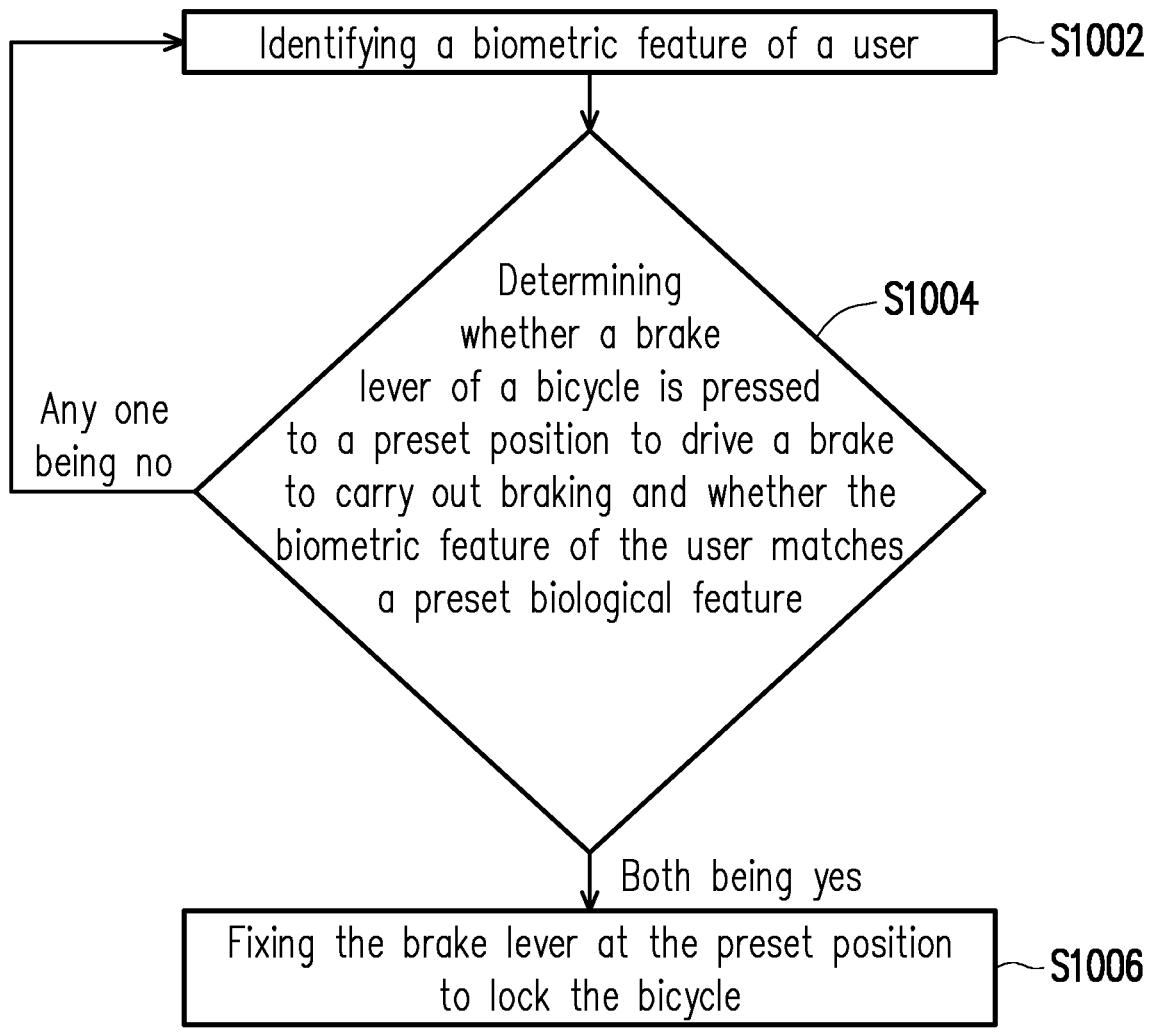
FIG. 10 is a schematic diagram illustrating an anti-theft method for a bicycle according to an embodiment of the disclosure.

FIG. 10 is a schematic diagram illustrating an anti-theft method for a bicycle according to an embodiment of the disclosure. According to the previous embodiments, it can be known that the anti-theft method for the bicycle can include the following steps. Firstly, a biometric feature of a user is identified (step S1002). Next, a brake lever of the bicycle is being determined on whether it is pressed to the preset position to drive a brake to carry out braking and the biometric feature of the user is being determined on whether it matches the preset biological feature (step S1004), wherein the preset biological feature may, for example, include at least one of a fingerprint, a palm print, a vocal print and vascular markings of the user, but not limited thereto; in some of the embodiments, biometric feature information of the user may also be received by wireless communication and be used for determining whether the biometric feature of the user matches the preset biological feature. When the brake lever is pressed to the preset position to drive the brake to carry out braking and the biometric feature of the user matches the preset biological feature, the brake lever is to be fixed at the preset position to lock the bicycle (step S1006). On the contrary, if the brake lever is not pressed to the preset position or the biometric feature of the user does not match the preset biological feature, then returning back to the step S1002 to continue identifying the biometric feature of the user.

Figure 11:
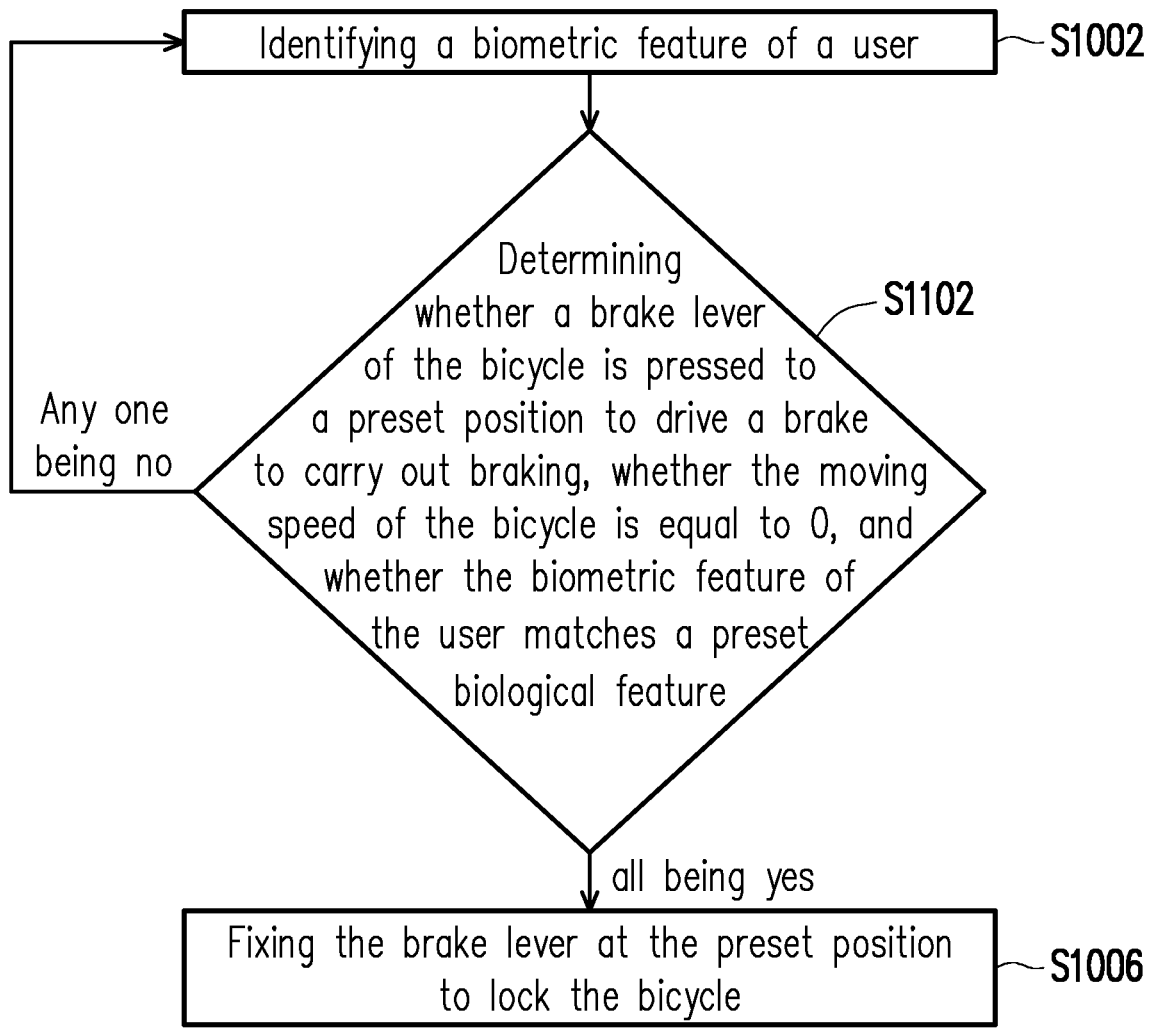
FIG. 11 is a schematic diagram illustrating an anti-theft method for a bicycle according to another embodiment of the disclosure.

FIG. 11 is a schematic diagram illustrating an anti-theft method for a bicycle according to another embodiment of the disclosure. In the present embodiment, after step S1002, in addition to determining whether the brake lever of the bicycle is pressed to a preset position to drive the brake to carry out braking, and whether the biometric feature of the user matches the preset biological feature, step S1102 further includes determining whether the moving speed of the bicycle is equal to zero. When the brake lever is pressed to the preset position to drive the brake to carry out braking, the moving speed of the bicycle is equal to 0, and the biometric feature of the user matches the preset biological feature, step S1006 is entered to lock the bicycle. In this way, it can be avoided that the bicycle is unintentionally locked when the bicycle has not been completely stopped, and the safety can be further improved.

In summary, in the embodiments of the disclosure, when the biometric feature of the user matches the preset biological feature, at least one action of locking the bicycle and driving the variable structure to make personalized adjustments according to the bicycle adjustment parameters corresponding to the biometric feature of the user can be executed, thereby achieving the purpose of improving the convenience of use of the bicycle.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An anti-theft apparatus for a bicycle, comprising
   a fixing device, comprising a motor and a fixing bolt which is movable;
   a biometric feature identification sensor, identifying a biometric feature of a user;
   a brake;
   a brake lever, coupled to the brake, the brake is operated along with movement of the brake lever, wherein the brake lever comprises a fixing hole; and
   a control chip, coupled to the biometric feature identification sensor and the motor, wherein when the brake lever is pressed to a preset position to drive the brake to carry out braking and the biometric feature of the user matches a preset biological feature, the control chip controls the motor to drive the fixing bolt into the fixing hole so as to fix the brake lever at the preset position to lock the bicycle.

2. The anti-theft apparatus as recited in claim 1, wherein the biometric feature identification sensor comprises a fingerprint sensor disposed on a handlebar beside the brake lever.

3. The anti-theft apparatus as recited in claim 1, wherein the control chip further receives a biometric feature information by wireless communication and determines whether the biometric feature information matches the preset biological feature.

4. The anti-theft apparatus as recited in claim 1, wherein the preset biological feature comprises at least one of a fingerprint, a palm print, a vocal print and vascular markings of the user.

5. The anti-theft apparatus as recited in claim 1, when the brake lever is pressed to the preset position to drive the brake to carry out braking, a moving speed of the bicycle is equal to zero, and the biometric feature of the user matches the preset biological feature, the control chip controls the motor to fix the brake lever at the preset position to lock the bicycle.

6. The anti-theft apparatus as recited in claim 5, comprising:
   a moving state sensor, coupled to the control chip, sensing a moving state of the bicycle to generate a moving state sensing signal, the control chip determines whether the moving speed of the bicycle is equal to zero according to the moving state sensing signal.

7. The anti-theft apparatus as recited in claim 6, wherein the moving state sensor comprises at least one of a wheel speed sensor, a gravity sensor, a gyroscope sensor, an inertial measurement unit sensor and an acceleration sensor.

8. An anti-theft method, adapted for an anti-theft apparatus of a bicycle, the anti-theft apparatus comprises a fixing bolt which is movable, the anti-theft method comprising:
identifying a biometric feature of a user;
determining whether a brake lever of the bicycle is pressed to a preset position to drive a brake to carry out braking and whether the biometric feature of the user matches a preset biological feature, wherein the brake lever comprises a fixing hole; and
when the brake lever is pressed to the preset position to drive the brake to carry out braking and the biometric feature of the user matches the preset biological feature, fixing the brake lever at the preset position by driving the fixing bolt into the fixing hole, so as to lock the bicycle.

9. The anti-theft method as recited in claim 8, comprising:
receiving a biometric feature information by wireless communication; and
determining whether the brake lever of the brake is pressed to the preset position and whether the biometric feature information matches the preset biological feature.

10. The anti-theft method as recited in claim 8, wherein the preset biological feature comprises at least one of a fingerprint, a palm print, a vocal print and vascular markings of the user.

11. The anti-theft method as recited in claim 8, comprising:
determining whether a moving speed of the bicycle is equal to zero; and
when the brake lever is pressed to the preset position to drive the brake to carry out braking, the moving speed of the bicycle is equal to zero and the biometric feature of the user matches the preset biological feature, fixing the brake lever at the preset position to lock the bicycle.

12. An anti-theft apparatus for a bicycle, comprising:
a fixing device, comprising a motor and a hook which is movable;
a biometric feature identification sensor, identifying a biometric feature of a user;
a brake;
a brake lever, coupled to the brake, the brake is operated along with movement of the brake lever, wherein the brake lever comprises an engaging slot; and
a control chip, coupled to the biometric feature identification sensor and the motor, wherein when the brake lever is pressed to a preset position to drive the brake to carry out braking and the biometric feature of the user matches a preset biological feature, the control chip controls the motor to drive the hook to be engaged within the engaging slot so as to fix the brake lever at the preset position to lock the bicycle.

13. The anti-theft apparatus as recited in claim 12, wherein the control chip further receives a biometric feature information by wireless communication and determines whether the biometric feature information matches the preset biological feature, wherein the preset biological feature comprises at least one of a fingerprint, a palm print, a vocal print and vascular markings of the user.

14. The anti-theft apparatus as recited in claim 12, comprising:
a moving state sensor, coupled to the control chip, sensing a moving state of the bicycle to generate a moving state sensing signal, the control chip determines whether a moving speed of the bicycle is equal to zero according to the moving state sensing signal; and
when the brake lever is pressed to the preset position to drive the brake to carry out braking, the moving speed of the bicycle is equal to zero, and the biometric feature of the user matches the preset biological feature, the control chip controls the motor to fix the brake lever at the preset position to lock the bicycle,
wherein the moving state sensor comprises at least one of a wheel speed sensor, a gravity sensor, a gyroscope sensor, an inertial measurement unit sensor and an acceleration sensor.

15. An anti-theft method, adapted for an anti-theft apparatus of a bicycle, the anti-theft apparatus comprises a hook which is movable, the anti-theft method comprising:
identifying a biometric feature of a user;
determining whether a brake lever of the bicycle is pressed to a preset position to drive a brake to carry out braking and whether the biometric feature of the user matches a preset biological feature, wherein the brake lever comprises an engaging slot; and
when the brake lever is pressed to the preset position to drive the brake to carry out braking and the biometric feature of the user matches the preset biological feature, fixing the brake lever at the preset position by driving the hook to be engaged within the engaging slot, so as to lock the bicycle.

16. The anti-theft method as recited in claim 15, comprising,
receiving a biometric feature information by wireless communication; and
determining whether the brake lever of the brake is pressed to the preset position and whether the biometric feature information matches the preset biological feature,
wherein the preset biological feature comprises at least one of a fingerprint, a palm print, a vocal print and vascular markings of the user.

17. The anti-theft method as recited in claim 15, comprising,
determining whether a moving speed of the bicycle is equal to zero; and
when the brake lever is pressed to the preset position to drive the brake to carry out braking, the moving speed of the bicycle is equal to zero and the biometric feature of the user matches the preset biological feature, fixing the brake lever at the preset position to lock the bicycle.

* * * * *